United States Patent
Tung

(10) Patent No.: US 10,737,386 B2
(45) Date of Patent: Aug. 11, 2020

(54) AUTOMATIC CONTROL METHOD AND AUTOMATIC CONTROL DEVICE

(71) Applicant: New Era AI Robotic Inc., Taipei (TW)

(72) Inventor: Chi-Chang Tung, Taipei (TW)

(73) Assignee: New Era AI Robotic Inc., Taipei (TW)

(*) Notice: Subject to any disclaimer, the term of this patent is extended or adjusted under 35 U.S.C. 154(b) by 37 days.

(21) Appl. No.: 16/188,317

(22) Filed: Nov. 13, 2018

(65) Prior Publication Data
US 2020/0061815 A1    Feb. 27, 2020

(30) Foreign Application Priority Data
Aug. 22, 2018  (CN) .......................... 2018 1 0959170

(51) Int. Cl.
| B25J 9/16 | (2006.01) |
| B25J 9/12 | (2006.01) |
| B25J 19/02 | (2006.01) |
| H02P 29/60 | (2016.01) |
| F16H 1/22 | (2006.01) |

(52) U.S. Cl.
CPC ............ B25J 9/1633 (2013.01); B25J 9/126 (2013.01); B25J 19/02 (2013.01); H02P 29/60 (2016.02); F16H 1/22 (2013.01)

(58) Field of Classification Search
None
See application file for complete search history.

(56) References Cited

U.S. PATENT DOCUMENTS

| 5,086,263 | A | * | 2/1992 | Kubota | ................ | G05B 19/232 |
| | | | | | | 318/568.11 |
| 6,046,566 | A | * | 4/2000 | Sonoda | ................ | G05B 19/182 |
| | | | | | | 318/568.22 |
| 9,755,566 | B2 | * | 9/2017 | Okita | ..................... | H02P 29/60 |
| 2016/0056736 | A1 | | 2/2016 | Eguchi | | |
| 2017/0308041 | A1 | * | 10/2017 | Morita | ..................... | H02P 5/56 |
| 2018/0154516 | A1 | | 6/2018 | Chiu et al. | | |
| 2018/0254721 | A1 | * | 9/2018 | Koike | ....................... | H02P 5/51 |
| 2019/0288620 | A1 | * | 9/2019 | Koike | ................. | G03G 15/602 |

FOREIGN PATENT DOCUMENTS

| JP | 2004288164 | 10/2004 |
| WO | 2013104417 | 7/2013 |
| WO | 2017186293 | 11/2017 |

OTHER PUBLICATIONS

"Search Report of Europe Counterpart Application," dated Sep. 26, 2019, pp. 1-10.
"Office Action of Japan Counterpart Application," dated Dec. 17, 2019, p. 1-p. 3.

* cited by examiner

Primary Examiner — Bickey Dhakal
(74) Attorney, Agent, or Firm — JCIPRNET

(57) ABSTRACT

An automatic control method and an automatic control device are provided. The automatic control device includes an automatic joint mechanism and a processor. The automatic joint mechanism includes a first motor and a second motor. The processor is adapted to perform a force adjustment on the first motor and the second motor. When a first motor state parameter of the first motor is different from a second motor state parameter of the second motor, the processor adjusts at least one of a first target position parameter of the first motor and a second target position parameter of the second motor, so that a degree of force of at least one of the first motor and the second motor is automatically and correspondingly adjusted.

4 Claims, 9 Drawing Sheets

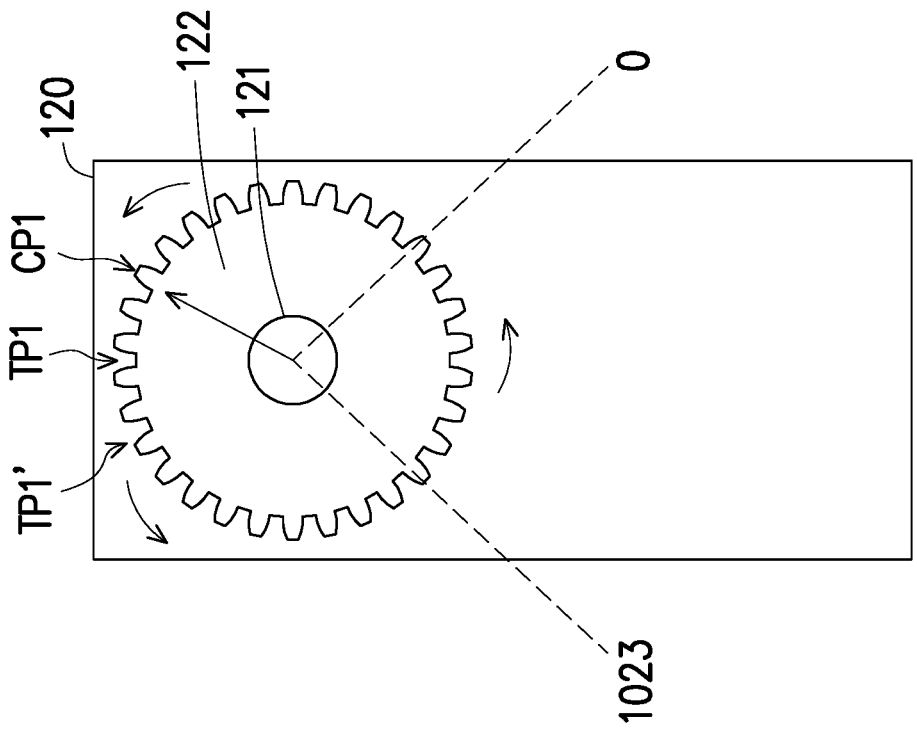
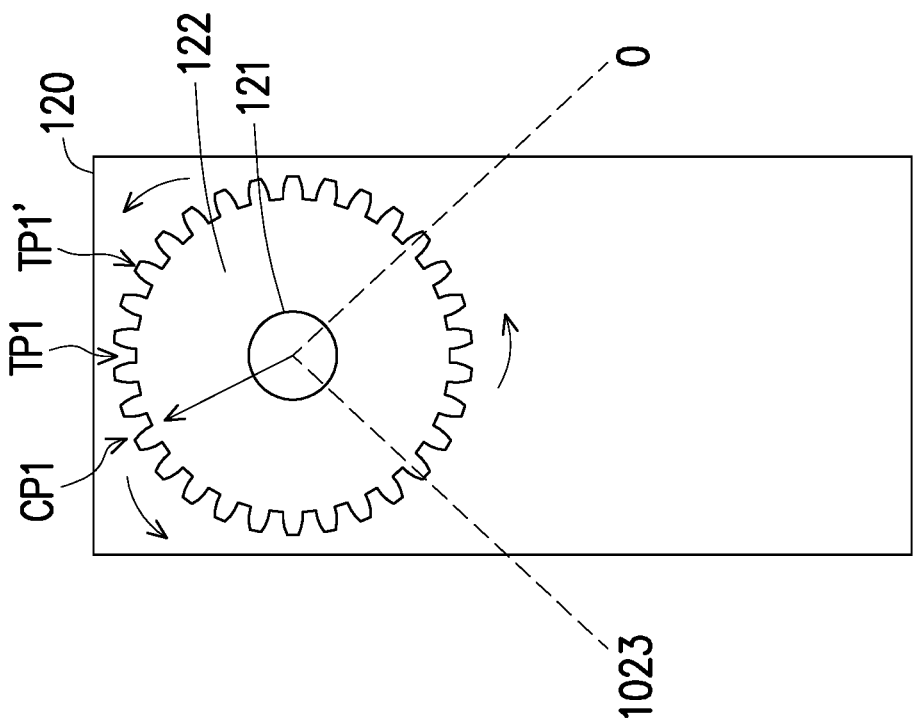

AUTOMATIC CONTROL METHOD AND AUTOMATIC CONTROL DEVICE

CROSS-REFERENCE TO RELATED APPLICATION

This application claims the priority benefit of China application serial no. 201810959170.0, filed on Aug. 22, 2018. The entirety of the above-mentioned patent application is hereby incorporated by reference herein and made a part of this specification.

BACKGROUND OF THE INVENTION

1. Field of the Invention

The invention relates to a control technique, and more particularly, to an automatic control method and an automatic control device.

2. Description of Related Art

In recent years, with the development of automatic control devices becoming more diverse, various automatic control devices have been designed and applied in various fields. The automatic control devices may be, for example, robots, robotic arms or other mechanical organisms. Accordingly, the automatic control device usually needs to form an automatic joint mechanism through a plurality of motors to move a robotic arm by simultaneously operating the motors disposed in the automatic joint mechanism. However, because the motors may have different degrees of force, when the automatic joint mechanism is fixed to one specific action, the motor with higher degree of force would gradually rise, resulting in power loss due to the motor being overheated. In consideration of the above, several embodiments are provided below and served to describe how an effective adjusting procedure can be made to the degrees of force of the motors so the motors can achieve an even force output to thereby effectively reduce the occurrence of power loss due to the motor being overheated.

SUMMARY OF THE INVENTION

The invention provides an automatic control method and an automatic control device, which can be used to automatically adjust a degree of force of at least one of a first motor and a second motor in an automatic joint mechanism, so that the first motor and the second motor can have the even force output to effectively solve the problem of an uneven force output for the first motor and the second motor.

The automatic control method is adapted to the automatic joint mechanism. The automatic joint mechanism includes the first motor and the second motor. The automatic control method is adapted to perform a force adjustment on the first motor and the second motor. The automatic control method includes the following steps: setting a first target position parameter of a first rotating shaft of the first motor and setting a second target position parameter of a second rotating shaft of the second motor, so that the first rotating shaft and the second rotating shaft rotate simultaneously and respectively towards the first target position parameter and the second target position parameter; reading a first motor state parameter of the first motor and reading a second motor state parameter of the second motor; deciding whether to adjust a degree of force of at least one of the first motor and the second motor based on the first motor state parameter and the second motor state parameter; and when the first motor state parameter is different from the second motor state parameter, choosing at least one of the first motor and the second motor for adjusting at least one of the first target position parameter and the second target position parameter, so that the degree of force of at least one of the first motor and the second motor is automatically and correspondingly adjusted.

The automatic control device of the invention includes the automatic joint mechanism and a processor. The automatic joint mechanism includes the first motor and the second motor. The processor is coupled to the first motor and the second motor. The processor is adapted to perform a force adjustment on the first motor and the second motor. The processor sets a first target position parameter of a first rotating shaft of the first motor and sets a second target position parameter of a second rotating shaft of the second motor, so that the first rotating shaft and the second rotating shaft rotate simultaneously and respectively towards the first target position parameter and the second target position parameter. The processor reads a first motor state parameter of the first motor and reads a second motor state parameter of the second motor. The processor decides whether to adjust a degree of force of at least one of the first motor and the second motor based on the first motor state parameter and the second motor state parameter. When the first motor state parameter is different from the second motor state parameter, the processor chooses at least one of the first motor and the second motor for adjusting at least one of the first target position parameter and the second target position parameter, so that the degree of force of at least one of the first motor and the second motor is automatically and correspondingly adjusted.

Based on the above, the automatic control method and the automatic control device of the invention can effectively analyze the motor state parameter and update a target position of the rotating shaft of the motor so that the degree of force of the motor can be automatically and correspondingly adjusted. Therefore, the automatic control method and the automatic control device of the invention can effectively reduce the occurrence of power loss due to the motor being overheated.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5A is a schematic diagram of a first motor state according to the embodiment of FIG. 4A and FIG. 4B.

FIG. 5B is a schematic diagram of a second motor state according to the embodiment of FIG. 4A and FIG. 4B.

DESCRIPTION OF THE EMBODIMENTS

Figure 1:
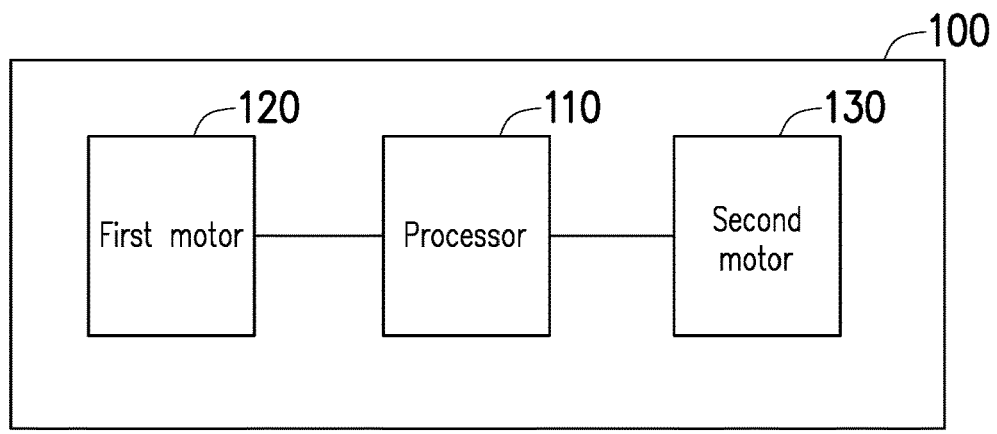
FIG. 1 is a block diagram of an automatic control device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In order to make content of the invention more comprehensible, embodiments are described below as the examples to prove that the invention can actually be realized. Moreover, elements/components/steps with same reference numerals represent same or similar parts in the drawings and embodiments.

FIG. 1 is a block diagram of an automatic control device according to an embodiment of the invention. With reference to FIG. 1, an automatic control device 100 includes a processor 110, a first motor 120 and a second motor 130. The processor 110 is coupled to the first motor 120 and the second motor 130. In this embodiment, the automatic control device 100 may include an automatic joint mechanism, and the first motor 120 and the second motor 130 are disposed in the automatic joint mechanism. For instance, the first motor 120 and the second motor 130 may be commonly combined with a robotic arm to complete actions of the robotic arm in a simultaneously operating manner. However, the automatic control device 100 of the invention is not limited by the two motors. In one embodiment, the automatic control device 100 may include more than two motors to form one automatic joint mechanism.

In this embodiment, the processor 110 is adapted to perform a force adjustment on the first motor and the second motor. In the present embodiment, the processor 110 may be, for example, a central processing unit (CPU), or other programmable devices for general purpose or special purpose, such as a microprocessor and a digital signal processor (DSP), a programmable controller, an application specific integrated circuit (ASIC), a programmable logic device (PLD) or other similar circuits or a combination of above-mentioned circuits. In addition, the automatic control device 100 may further include a memory. The memory may be used to record related algorithm, software or module for realizing the automatic control method described in each embodiment of the invention, which may be read and executed by the processor 110.

In this embodiment, the first motor 120 and the second motor 130 may be, for example, a smart servo motor, but the invention is not limited thereto. In this embodiment, each of the first motor 120 and the second motor 130 can receive control commands from the processor 110 so as to perform the corresponding operations. The control commands output by the processor 110 may be, for example, a read ID command, a set ID command, a fix command, a release command, a command for turning to a target angle within a given time, a command for reading the target angle, a command for reading a current rotating angle and a command for setting the target angle, which are not particularly limited by the invention. Further, each of the first motor 120 and the second motor 130 may further include a position sensor and a temperature sensor. The position sensor is used to sense a rotating position of a rotating shaft so the processor 110 can obtain position parameters described in each embodiment by reading the position sensor. The temperature sensor is used to sense a body temperature of the motor so the processor 110 can obtain temperature parameters described in each embodiment by reading the temperature sensor.

Figure 2:
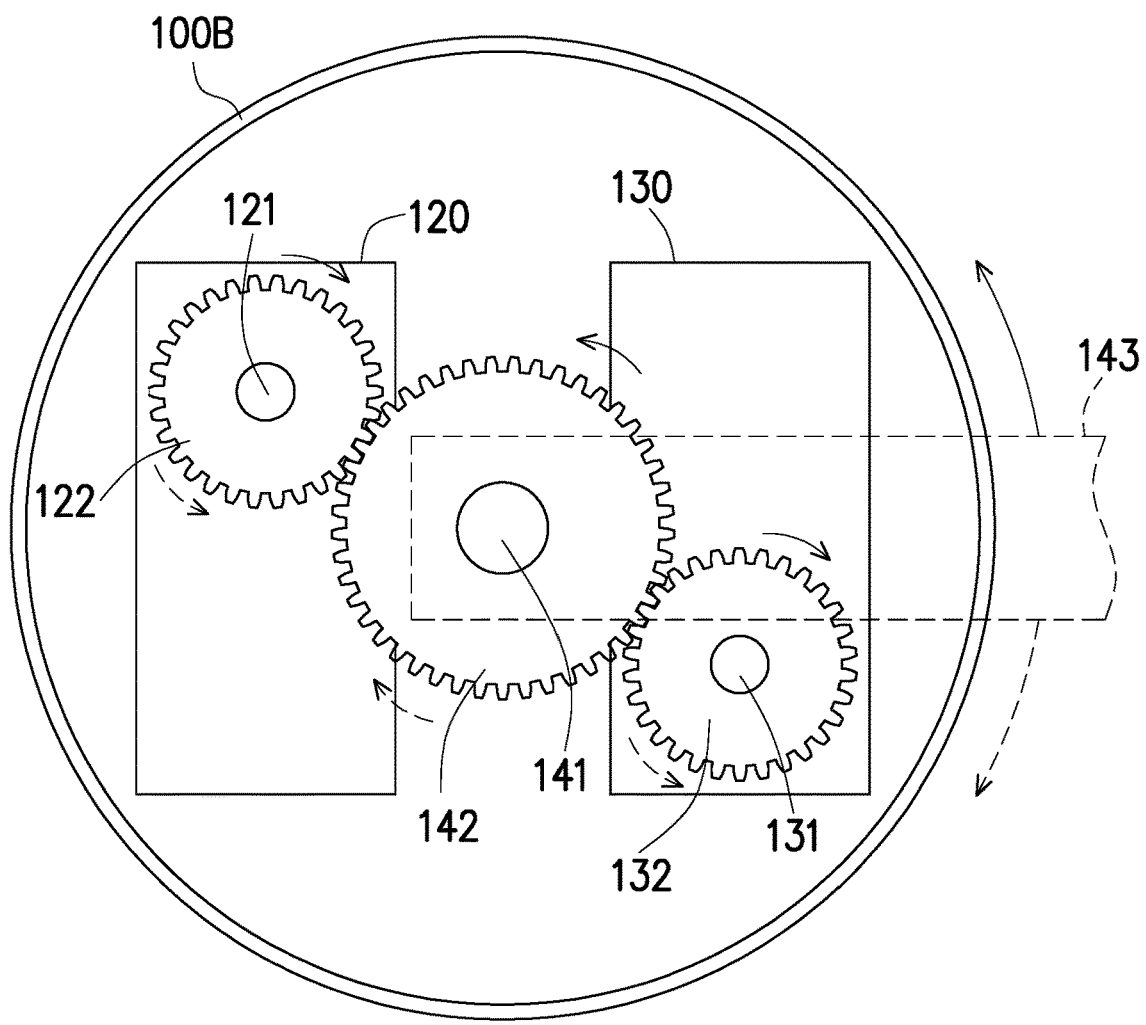
FIG. 2 is a schematic diagram illustrating an example of the automatic control device according to the embodiment of FIG. 1.

FIG. 2 is a schematic diagram illustrating an example of the automatic control device according to the embodiment of FIG. 1. With reference to FIG. 1 and FIG. 2, an automatic joint mechanism 100B of FIG. 2 is an exemplary embodiment of the automatic control device 100 of FIG. 2, but the automatic control device of the invention is not limited thereto. In an embodiment, the automatic control device 100 of FIG. 1 may also be other mechanisms. In this embodiment, the automatic joint mechanism 100B is a robotic arm mechanism. The automatic joint mechanism 100B includes the first motor 120, the second motor 130, a joint rotating shaft 141, a joint gear 142 and a robotic arm 143. The first motor 120 includes a first shaft 121 and a first gear 122. The second motor 130 includes a second shaft 131 and a second gear 132. The first rotating shaft 121 is combined with the first gear 122 so that the first rotating shaft 121 rotates in synchronization with the first gear 122. The second rotating shaft 131 is combined with the second gear 132 so that the second rotating shaft 131 rotates in synchronization with the second gear 132. The joint rotating shaft 141 is combined with the joint gear 142 so that the joint rotating shaft 141 rotates in synchronization with the joint gear 142. The robotic arm 143 is fixed onto the joint arm 142 so that the robotic arm 143 and the joint gear 142 are interlocked. In this embodiment, the first gear 122 is engaged with the joint gear 142 and the second gear 132 is engaged with the joint gear 142 so that the first gear 122, the second gear 132 and the joint gear 142 rotate in synchronization.

Figure 3:
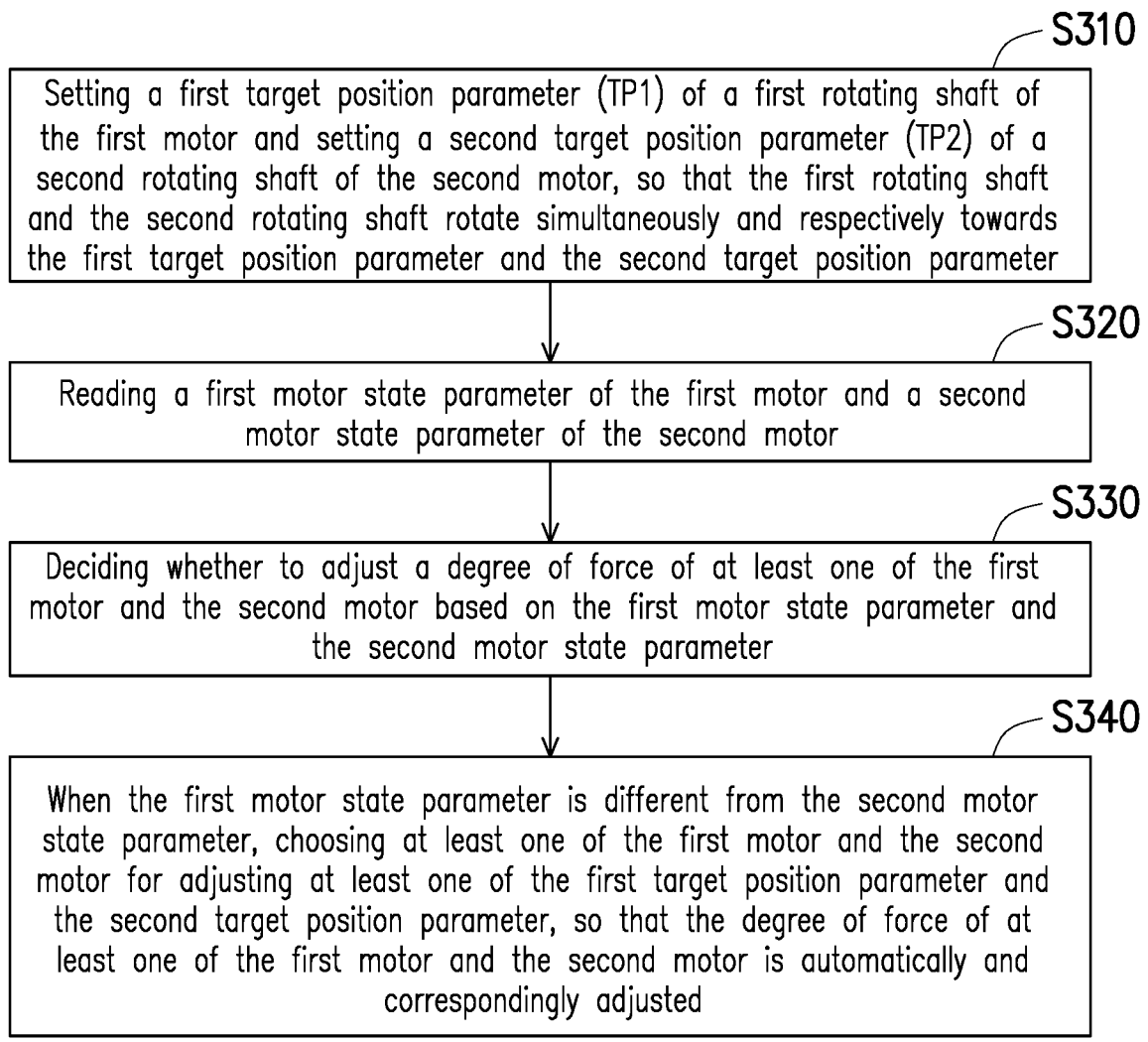
FIG. 3 is a flowchart of an automatic control method according to an embodiment of the invention.

FIG. 3 is a flowchart of an automatic control method according to an embodiment of the invention. With reference to FIG. 1 and FIG. 3, the automatic control method of FIG. 3 is at least adapted to the automatic control device 100 of FIG. 1 and FIG. 2. The processor 110 of the automatic control device 100 can execute steps S310 to S340 to perform a force adjustment on the first motor 120 and the second motor 130. In step S310, the processor 110 can set a first target position parameter (TP1) of the first rotating shaft 121 of the first motor 120 and set a second target position parameter (TP2) of the second rotating shaft 131 of the second motor 130, so that the first rotating shaft 121 and the second rotating shaft 131 rotate simultaneously and respectively towards the first target position parameter (TP1) and the second target position parameter (TP2). However, it should be noted that, although the processor 110 does drive the first motor 120 and the second motor 130 according to the first target position parameter (TP1) and the second target position parameter (TP2), as an actual rotating result, the first rotating shaft 121 and the second rotating shaft 131 may not be able to rotate to the first target position parameter (TP1) and the second target position parameter (TP2) for sure due to influence of gravity on the robotic arm 143 or a mechanical structure design of the automatic joint mechanism 100B. When that happens, the first motor 120 and the second motor 130 may encounter the uneven force output, which further leads to at least one motor among the first motor 120 and the second motor 130 being overheated.

Therefore, in step S320, after the first rotating shaft 121 and the second rotating shaft 131 rotate to a first current position and a second current position according to the first target position parameter (TP1) and the second target position parameter (TP2), the processor 110 can read a first motor state parameter of the first motor 120 and a second motor state parameter of the second motor 130. In step S330, the processor 110 can decide whether to adjust a degree of force of at least one of the first motor 120 and the second motor 130 based on the first motor state parameter and the second motor state parameter. In step S340, when the first motor state parameter is different from the second motor state parameter, the processor 110 can choose at least one of the first motor 120 and the second motor 130 for adjusting at least one of the first target position parameter (TP1) and the second target position parameter (TP2), so that the degree of force of at least one of the first motor 120 and the second motor 130 is automatically and correspondingly adjusted.

Specifically, first of all, the processor 110 can read the first motor 120 for obtaining a first current position parameter (CP1) of the first motor 120, and read the second motor 130 for obtaining a second current position parameter (CP2) of the second motor 130. The processor 110 can subtract the first current position parameter (CP1) from the first target position parameter (TP1) to obtain a first position deviation parameter (DP1=TP1−CP1), and can subtract the second current position parameter (CP2) from the second target position parameter (TP2) to obtain a second position deviation parameter (DP2=TP2−CP2). Next, the processor 110 uses an absolute value of the first position deviation parameter (|DP1|) of the first motor 120 as the first motor state parameter, and uses an absolute value of the second position deviation parameter (|DP2|) of the second motor 130 as the second motor state parameter. Lastly, the processor 110 can decide to adjust the degree of force of at least one of the first motor 120 and the second motor 130 by determining whether the absolute value of the first position deviation parameter (|DP1|) is equal to the absolute value of the second position deviation parameter (|DP2|). In this way, the automatic control method of the present embodiment can effectively adjust the degree of force of at least one of the first motor 120 and the second motor 130 in the automatic joint mechanism 100B, so that the first motor 120 and the second motor 130 can have the even force output to effectively solve the problem of the uneven force output for the first motor 120 and the second motor 130.

The embodiments of FIG. 4A to FIG. 5B are exemplary embodiments proposed for adjusting the motor with smaller degree of force.

Figure 4A:
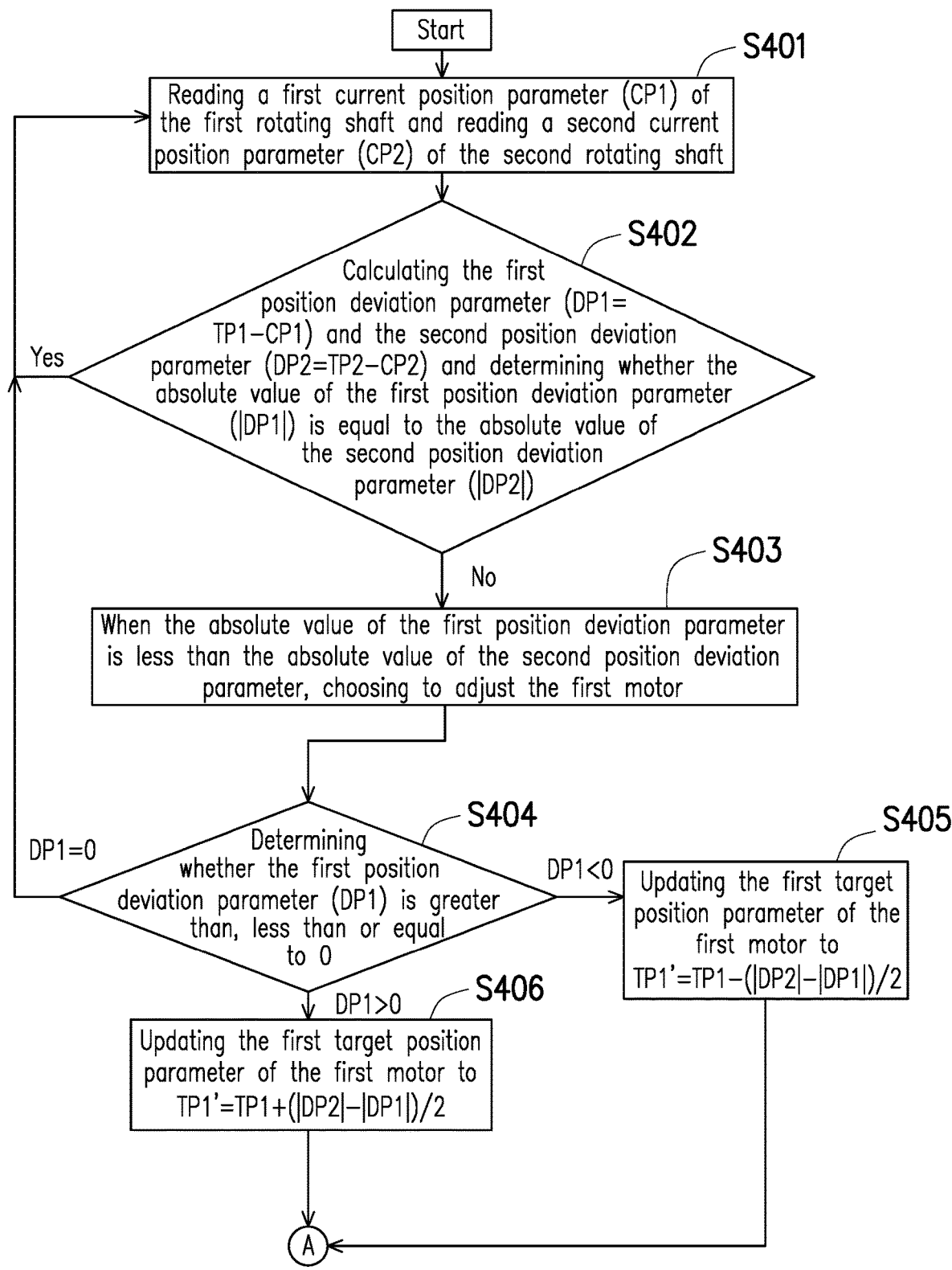
FIG. 4A and FIG. 4B are a flowchart of an automatic control method according to the first embodiment of the invention.
Figure 4B:
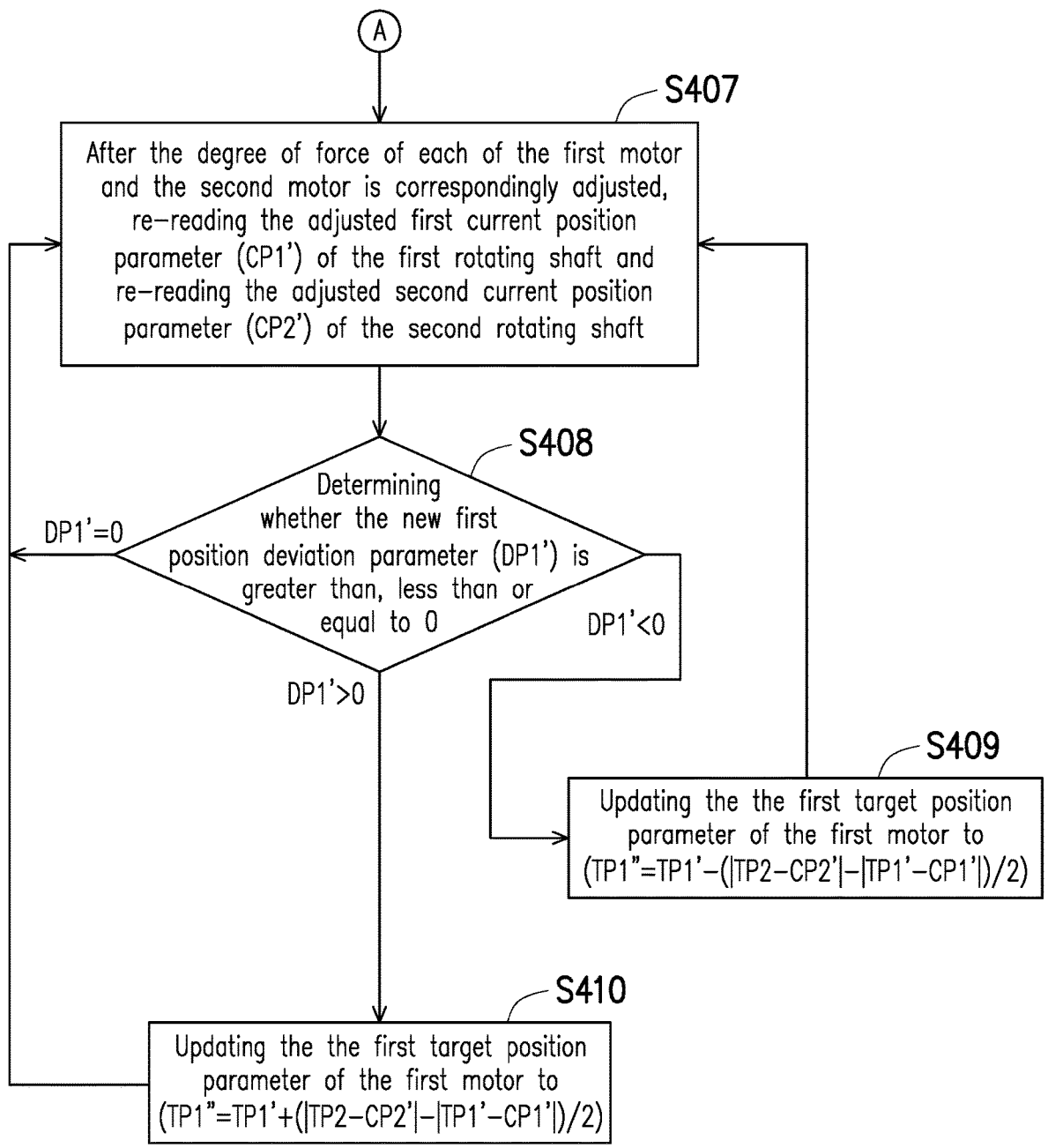

FIG. 4A and FIG. 4B are a flowchart of an automatic control method according to the first embodiment of the invention. With reference to FIG. 1, FIG. 2, FIG. 4A and FIG. 4B, the automatic control method of FIG. 4A and FIG. 4B are at least adapted to the automatic control device 100 of FIG. 1 and FIG. 2. The processor 110 of the automatic control device 100 can execute steps S401 to S410 to perform a force adjustment on the first motor 120 and the second motor 130. It should be noted that, as assumed in this embodiment, the degree of force of the first motor 120 is smaller than that of the second motor 130, and the processor 110 adjusts the first target position parameter (TP1) of the first motor 120 with smaller degree of force. Accordingly, in step S401, the processor 110 can read the first current position parameter (CP1) of the first rotating shaft 121 and read the second current position parameter (CP2) of the second rotating shaft 131. In step S402, the processor 110 can calculate the first position deviation parameter (DP1) and the second position deviation parameter (DP2) and determine whether the absolute value of the first position deviation parameter (|DP1|) is equal to the absolute value of the second position deviation parameter (|DP2|). For example, the processor 110 obtains the first position deviation parameter (DP1) by subtracting the first current position parameter from the first target position parameter (DP1=TP1−CP1), and obtains the second position deviation parameter (DP2) by subtracting the second current position parameter from the second target position parameter (DP2=TP2−CP2). The processor 110 uses the absolute value of the first position deviation parameter (|DP1|) as the first motor state parameter, and uses the absolute value of the second position deviation parameter (|DP2|) as the second motor state parameter.

In step S403, when the absolute value of the first position deviation parameter is less than the absolute value of the second position deviation parameter (|DP1|<|DP2|), it means that the degree of force of the first motor 120 is smaller than that of the second motor 130, and thus the processor 110 chooses to adjust the first motor 120 with smaller degree of force. Further, the processor 110 would execute computations to obtain a plurality of parameters in advance. In this embodiment, the processor 110 obtains a first parameter equal to the absolute value of the first position deviation parameter (|DP1|). The processor 110 obtains a second parameter equal to the absolute value of the first position deviation parameter (|DP2|). The processor 110 obtains a third parameter by multiplying the second parameter minus the first parameter by one-half (((|DP2|−|DP1|)/2). Next, in step S404, the processor 110 determines whether the first position deviation parameter (DP1) is greater than, less than or equal to 0.

FIG. 5A is a schematic diagram of a first motor state according to the embodiment of FIG. 4A and FIG. 4B. FIG. 5B is a schematic diagram of a second motor state according to the embodiment of FIG. 4A and FIG. 4B. The following description for explaining how to adjust the degree of force of the first motor 120 may refer to FIG. 1, FIG. 2, FIG. 4A, FIG. 4B, FIG. 5A and FIG. 5B together. In this embodiment, the step number of the first motor 120 may be 0 to 1023. The first rotating shaft 121 of the first motor 120 starts to rotate by 0, and the position parameter is the value of the step number. Therefore, in continuation of step S404, if the processor 110 determines that the first position deviation parameter (DP1) is less than 0, it means that the first motor 120 is likely in the first motor state of FIG. 5A. In step S405, the processor 110 obtains a fourth parameter equal to the first target position parameter minus the third parameter, and updates the first target position parameter to the fourth parameter (TP1'=TP1−(|DP2|−|DP1|)/2). In other words, with the first target position parameter (TP1) of the first rotating shaft 121 updated to the updated first target position parameter (TP1') by the processor 110 for the first motor 120, the degree of force of the first motor 120 is automatically increased since the first current position parameter (CP1) is farther from the updated first target position parameter (TP1'). Further, incidentally, because the second motor 130 and the first motor 120 are interlocked to commonly apply a rotating force on the robotic arm 143, the degree of force of the second motor 130 is correspondingly changed if the degree of force of the first motor 120 is changed.

On the other hand, if the processor 110 determines that the first position deviation parameter (DP1) is greater than 0, it means that the first motor 120 is likely in the second motor state of FIG. 5B. In step S406, the processor 110 obtains a fifth parameter equal to the first target position parameter plus the third parameter, and updates the first target position parameter to the fifth parameter (TP1'=TP1+(|DP2|−|DP1|)/2). In other words, with the first target position parameter (TP1) of the first rotating shaft 121 updated to the updated first target position parameter (TP1') by the processor 110 for the first motor 120, the degree of force of the first motor 120 is automatically increased since the first current position parameter (CP1) is farther from the updated first target position parameter (TP1'). Further, similarly, because the second motor 130 and the first motor 120 are interlocked to commonly apply a rotating force on the robotic arm 143, the degree of force of the second motor 130 is correspondingly changed if the degree of force of the first motor 120 is changed.

However, when the processor 110 determines that the first position deviation parameter (DP1) is equal to 0, the processor 110 would repeat the step S401 to re-read the first motor 120 and the second motor 130. In other words, since the degrees of force of the first motor 120 and the second motor 130 are changed over time, (non-constant force output), positions of the first rotating shaft 121 of the first motor 120 and the second rotating shaft 131 of the second motor 130 would show an oscillating effect over time (non-constant positions). In this regard, by continuously repeating step S401, the processor 110 can determine whether the first motor 120 is in the motor state of FIG. 5A or FIG. 5B so as to correspondingly update the first target position parameter (TP1).

The steps S401 to S406 above are used to roughly adjust the degree of force of the first motor 120, and the steps S407 to S410 below are used to finely adjust the degree of force of the first motor 120. In step S407, after the degree of force of each of the first motor 120 and the second motor 130 is correspondingly adjusted, the processor 110 re-reads the adjusted first current position parameter (CP1') of the first rotating shaft 121 and re-reads the adjusted second current position parameter (CP2') of the second rotating shaft 131. Further, the processor 110 would execute computations to obtain a plurality of parameters in advance. In this embodiment, the processor 110 obtains the new first position deviation parameter equal to the updated first target position parameter minus the adjusted first current position parameter (DP1'=TP1'−CP1'). The processor 110 obtains a sixth parameter equal to an absolute value of the new first position deviation parameter (|TP1'−CP1'|). The processor 110 obtains the new second position deviation parameter equal to the second target position parameter minus the adjusted second current position parameter (DP2'=TP2−CP2'). The processor 110 obtains a seventh parameter equal to an absolute value of the new second position deviation parameter (|TP2−CP2'|). The processor 110 obtains an eighth parameter by multiplying the seventh parameter minus the sixth parameter by one-half ((|TP2−CP2'|−|TP1'−CP1'|)/2). Next, in step S408, the processor 110 determines whether the new first position deviation parameter (DP1') is greater than, less than or equal to 0.

In this embodiment, if the processor 110 determines that the new first position deviation parameter (DP1') is less than 0, it means that the first motor 120 is likely in the first motor state of FIG. 5A. In step S409, the processor 110 obtains a ninth parameter equal to the new first target position parameter minus the eighth parameter, and updates the first target position parameter to the ninth parameter (TP1"=TP1'−(|TP2−CP2'|−|TP1'−CP1'|)/2). In other words, with the first target position parameter (TP1') of the first rotating shaft 121 updated to the updated first target position parameter (TP1") by the processor 110 for the first motor 120, the degree of force of the first motor 120 is automatically increased since the adjusted first current position parameter (CP1') is farther from the updated first target position parameter (TP1"). Further, incidentally, because the second motor 130 and the first motor 120 are interlocked to commonly apply a rotating force on the robotic arm 143, the degree of force of the second motor 130 is correspondingly changed if the degree of force of the first motor 120 is changed.

On the other hand, if the processor 110 determines that the new first position deviation parameter (DP1') is greater than 0, it means that the first motor 120 is likely in the second motor state of FIG. 5B. In step S410, the processor 110 obtains a tenth parameter equal to the new first target position parameter plus the eighth parameter, and updates the first target position parameter to the tenth parameter (TP1"=TP1'+(|TP2−CP2'|−|TP1'−CP1'|)/2). In other words, with the first target position parameter (TP1') of the first rotating shaft 121 updated to the updated first target position parameter (TP1") by the processor 110 for the first motor 120, the degree of force of the first motor 120 is automatically increased since the adjusted first current position parameter (CP1') is farther from the updated first target position parameter (TP1"). Further, similarly, because the second motor 130 and the first motor 120 are interlocked to commonly apply a rotating force on the robotic arm 143, the degree of force of the second motor 130 is correspondingly changed if the degree of force of the first motor 120 is changed.

However, when the processor 110 determines that the adjusted first position deviation parameter (DP1') is equal to 0, the processor 110 would repeat the step S407 to re-read the first motor 120 and the second motor 130. In other words, since the degrees of force of the first motor 120 and the second motor 130 are changed over time, (non-constant force output), positions of the first rotating shaft 121 of the first motor 120 and the second rotating shaft 131 of the second motor 130 would show an oscillating effect over time (non-constant positions). In this regard, by continuously repeating step S407, the processor 110 can determine whether the first motor 120 is in the motor state of FIG. 5A or FIG. 5B so as to perform a finer parameter adjustment on the updated first target position parameter (TP1') again.

In this way, the automatic control method of the present embodiment can sequentially increase the degree of force of the first motor 120 by a two-stage determination procedure, so that the first motor 120 and the second motor 130 can have the even force output to effectively solve the problem of the uneven force output for the first motor 120 and the second motor 130.

The embodiments of FIG. 6A to FIG. 7B are exemplary embodiments proposed for adjusting the motor with larger degree of force.

Figure 6A:
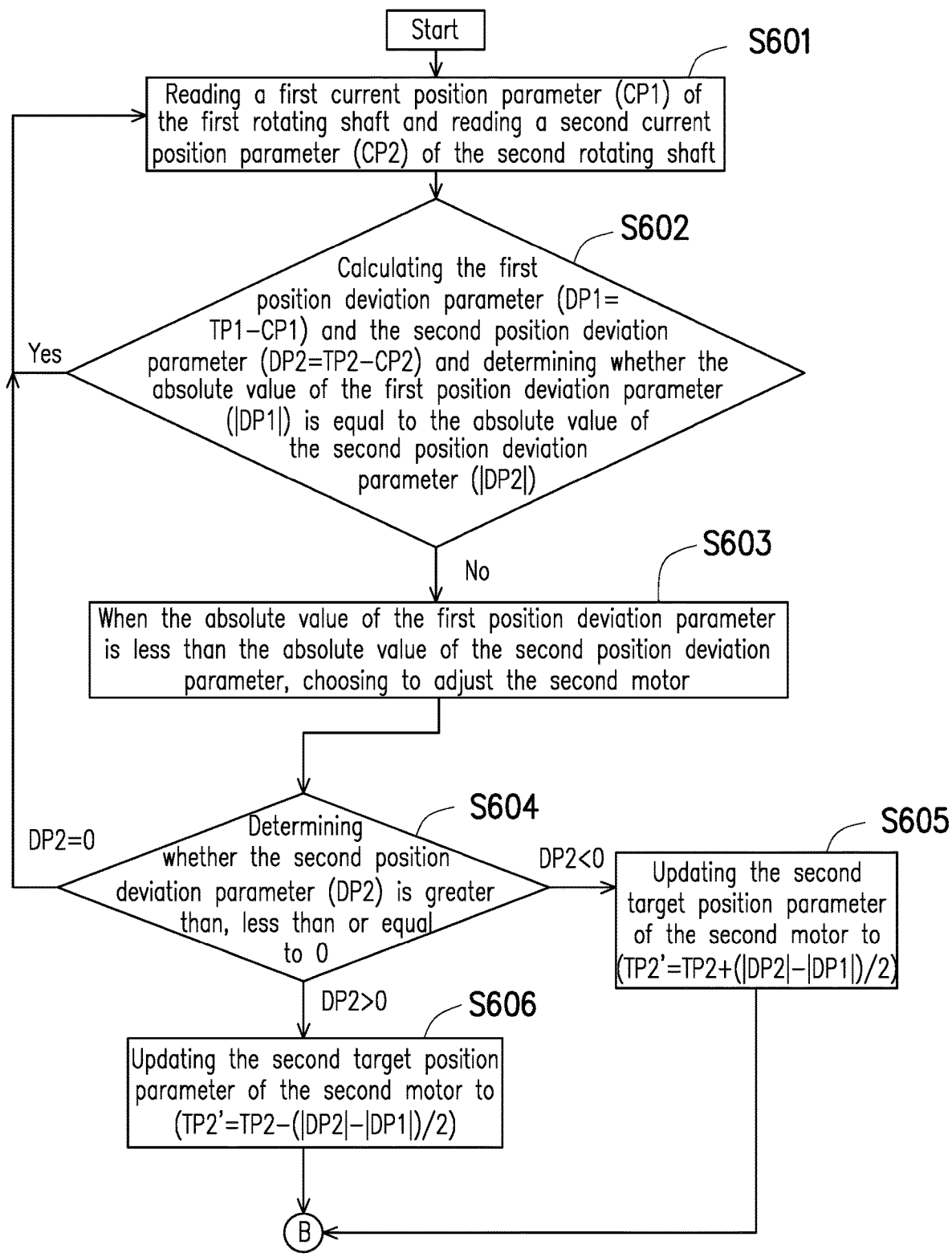
FIG. 6A and FIG. 6B are a flowchart of an automatic control method according to the second embodiment of the invention.
Figure 6B:
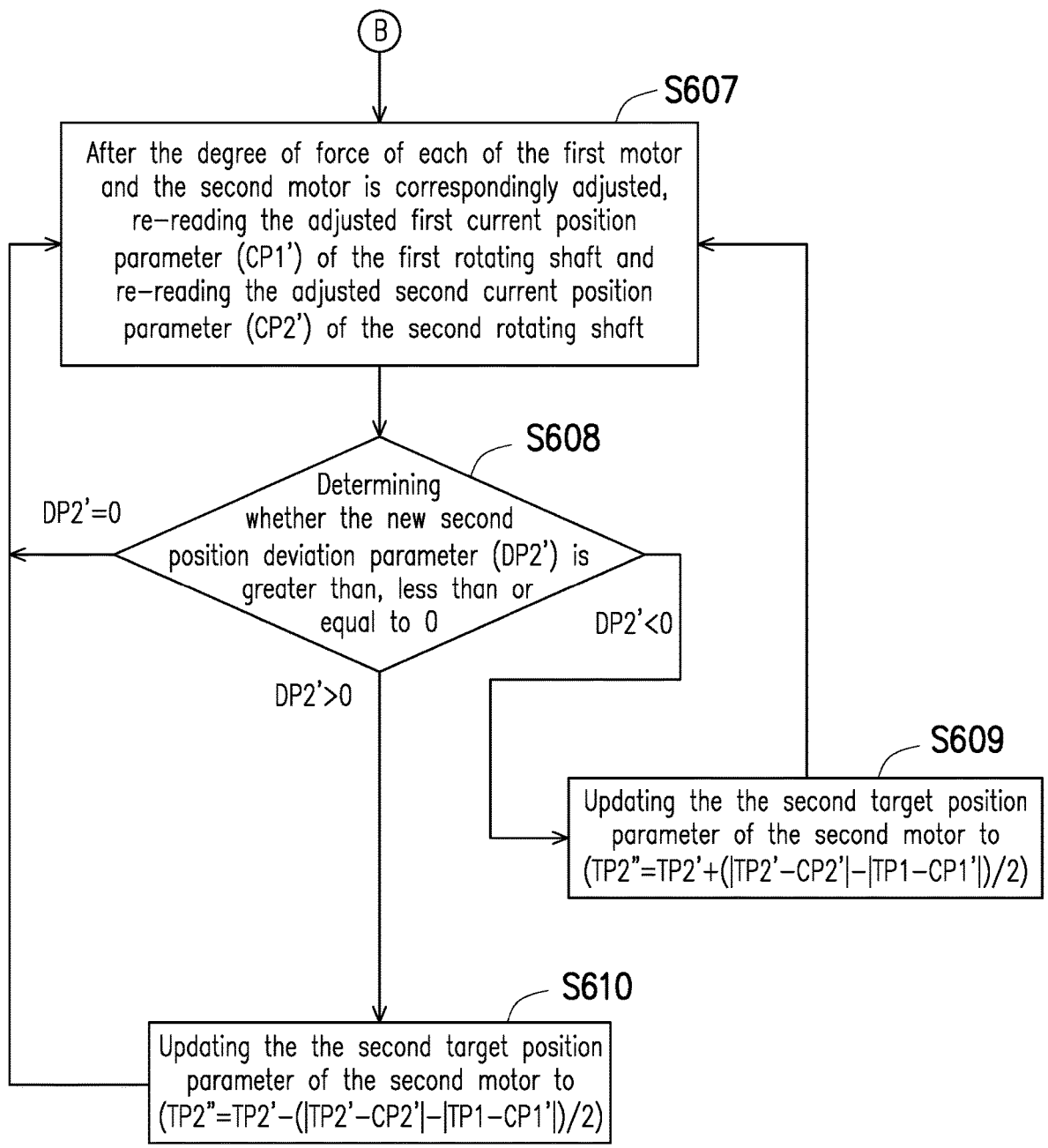

FIG. 6A and FIG. 6B are a flowchart of an automatic control method according to the second embodiment of the invention. With reference to FIG. 1, FIG. 2, FIG. 6A and FIG. 6B, the automatic control method of FIG. 6A and FIG. 6B is at least adapted to the automatic control device 100 of FIG. 1 and FIG. 2. The processor 110 of the automatic control device 100 can execute steps S601 to S610 to perform a force adjustment on the first motor 120 and the second motor 130. It should be noted that, as assumed in this embodiment, the degree of force of the first motor 120 is smaller than that of the second motor 130, and the processor 110 adjusts the second target position parameter (TP2) of the second motor 130 with larger degree of force. Accordingly, in step S601, the processor 110 can read the first current position parameter (CP1) of the first rotating shaft 121 and read the second current position parameter (CP2) of the second rotating shaft 131. In step S602, the processor 110 can calculate the first position deviation parameter (DP1) and the second position deviation parameter (DP2) and determine whether the absolute value of the first position deviation parameter (|DP1|) is equal to the absolute value of the second position deviation parameter (|DP2|). For example, the processor 110 obtains the first position deviation parameter (DP1) by subtracting the first current position parameter from the first target position parameter (DP1=TP1−CP1), and obtains the second position deviation parameter (DP2) by subtracting the second current position parameter from the second target position parameter (DP2=TP2−CP2). The processor 110 uses the absolute value of the first position deviation parameter (|DP1|) as the first motor state parameter, and uses the absolute value of the second position deviation parameter (|DP2|) as the second motor state parameter.

In step S603, when the absolute value of the first position deviation parameter is less than the absolute value of the second position deviation parameter (|DP1|<|DP2|), it means that the degree of force of the first motor 120 is smaller than that of the second motor 130, and thus the processor 110 chooses to adjust the second motor 130 with larger degree of force. Further, the processor 110 would execute computations to obtain a plurality of parameters in advance. In this embodiment, the processor 110 obtains a first parameter equal to the absolute value of the first position deviation parameter (|DP1|). The processor 110 obtains a second parameter equal to the absolute value of the first position deviation parameter (|DP2|). The processor 110 obtains a third parameter by multiplying the second parameter minus the first parameter by one-half ((|DP2|−|DP1|)/2). Next, in step S604, the processor 110 determines whether the second position deviation parameter (DP2) is greater than, less than or equal to 0.

Figure 7A:
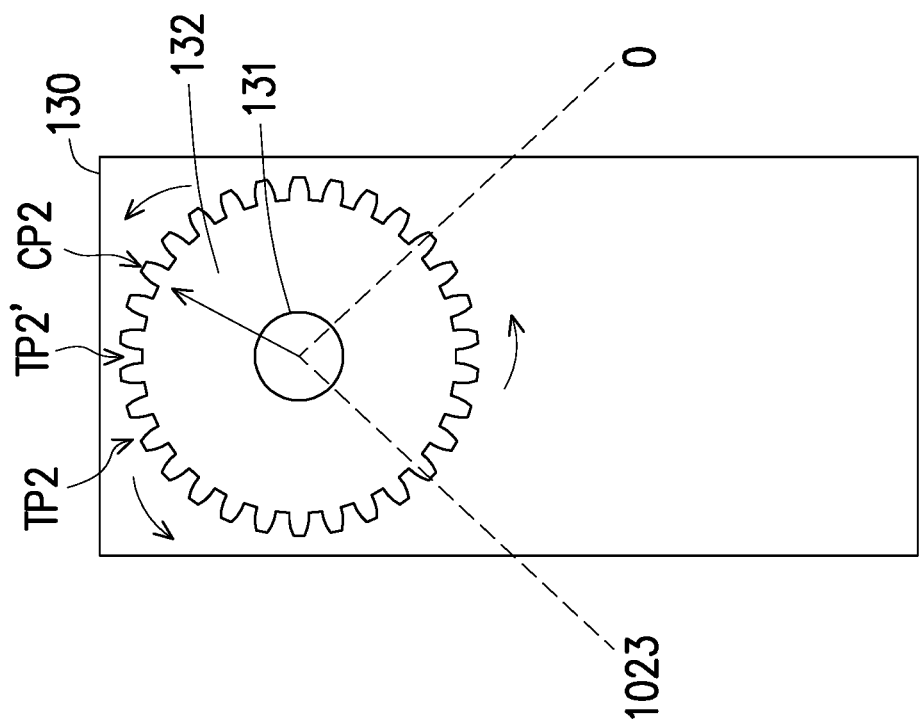
FIG. 7A is a schematic diagram of a first motor state according to the embodiment of FIG. 6A and FIG. 6B.
Figure 7B:
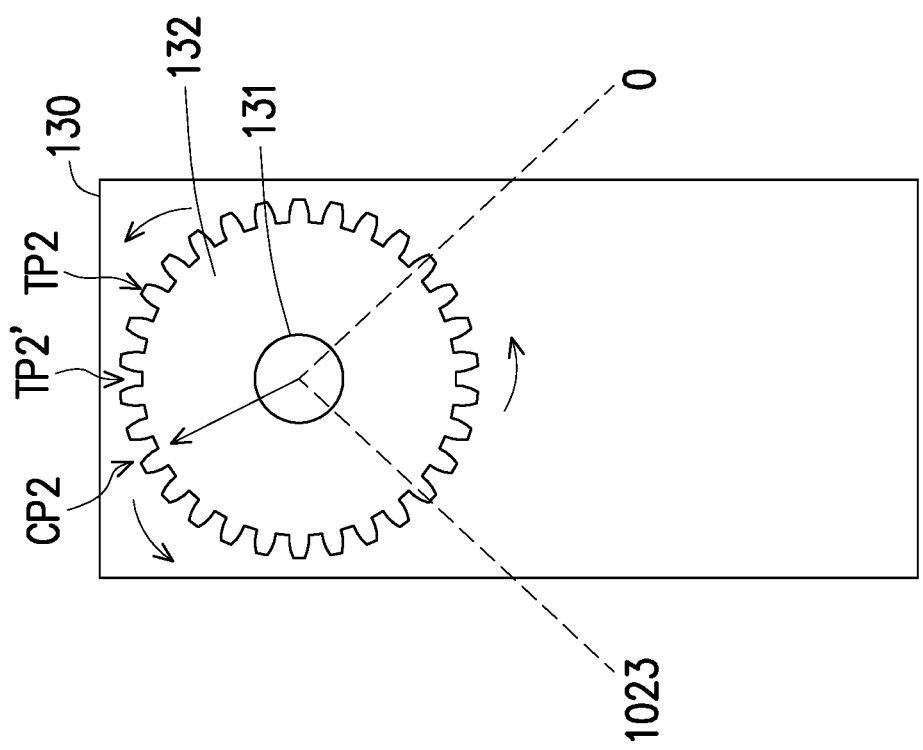
FIG. 7B is a schematic diagram of a second motor state according to the embodiment of FIG. 6A and FIG. 6B.

FIG. 7A is a schematic diagram of a first motor state according to the embodiment of FIG. 6A and FIG. 6B. FIG. 7B is a schematic diagram of a second motor state according to the embodiment of FIG. 6A and FIG. 6B. The following description for explaining how to adjust the degree of force of the second motor 130 may refer to FIG. 1, FIG. 2, FIG. 6A, FIG. 6B, FIG. 7A and FIG. 7B together. In this embodiment, the step number of the second motor 130 may be 0 to 1023. The second rotating shaft 131 of the second motor 130 starts to rotate by 0, and the position parameter is the value of the step number. Therefore, in continuation of step S604, if the processor 110 determines that the second position deviation parameter (DP2) is less than 0, it means that the second motor 130 is likely in the first motor state of FIG. 7A. In step S605, the processor 110 obtains a fourth parameter equal to the second target position parameter plus the third parameter, and updates the second target position parameter to the fourth parameter (TP2'=TP2+(|DP2|−|DP1|)/2). In other words, with the second target position parameter (TP2) of the second rotating shaft 131 updated to the updated second target position parameter (TP2') by the processor 110 for the second motor 130, the degree of force of the second motor 130 is automatically decreased since the second current position parameter (CP2) is closer to the updated second target position parameter (TP2'). Further, incidentally, because the first motor 120 and the second motor 130 are interlocked to commonly apply a rotating force on the robotic arm 143, the degree of force of the first motor 120 is correspondingly changed if the degree of force of the second motor 130 is changed.

On the other hand, if the processor 110 determines that the second position deviation parameter (DP2) is greater than 0, it means that the second motor 130 is likely in the second motor state of FIG. 7B. In step S606, the processor 110 obtains a fifth parameter equal to the second target position parameter minus the third parameter, and updates the second target position parameter to the fifth parameter (TP2'=TP2−(|DP2|−|DP1|)/2). In other words, with the second target position parameter (TP2) of the second rotating shaft 131 updated to the updated second target position parameter (TP2') by the processor 110 for the second motor 130, the degree of force of the second motor 130 is automatically decreased since the second current position parameter (CP2) is closer to the updated second target position parameter (TP2'). Further, similarly, because the first motor 120 and the second motor 130 are interlocked to commonly apply a rotating force on the robotic arm 143, the degree of force of the first motor 120 is correspondingly changed if the degree of force of the second motor 130 is changed.

However, when the processor 110 determines that the first position deviation parameter (DP1) is equal to 0, the processor 110 would repeat the step S601 to re-read the first motor 120 and the second motor 130. In other words, since the degrees of force of the first motor 120 and the second motor 130 are changed over time, (non-constant force output), positions of the first rotating shaft 121 of the first motor 120 and the second rotating shaft 131 of the second motor 130 would show an oscillating effect over time (non-constant positions). In this regard, by continuously repeating step S601, the processor 110 can determine whether the second motor 130 is in the motor state of FIG. 7A or FIG. 7B so as to correspondingly update the second target position parameter (TP2).

The steps S601 to S606 above are used to roughly adjust the degree of force of the second motor 130, and the steps S607 to S610 below are used to finely adjust the degree of force of the second motor 130. In step S607, after the degree of force of each of the first motor 120 and the second motor 130 is correspondingly adjusted, the processor 110 re-reads the adjusted first current position parameter (CP1') of the first rotating shaft 121 and re-reads the adjusted second current position parameter (CP2') of the second rotating shaft 131. Further, the processor 110 would execute computations to obtain a plurality of parameters in advance. In this embodiment, the processor 110 obtains the new first position deviation parameter equal to the first target position parameter minus the adjusted first current position parameter (DP1'=TP1−CP1'). The processor 110 obtains a sixth parameter equal to an absolute value of the new first position deviation parameter (|TP1−CP1'|). The processor 110 obtains the new second position deviation parameter equal to the updated second target position parameter minus the adjusted second current position parameter (DP2'=TP2'−CP2'). The processor 110 obtains a seventh parameter equal to an absolute value of the new second position deviation parameter (|TP2'−CP2'|). The processor 110 obtains an eighth parameter by multiplying the seventh parameter minus the sixth parameter by one-half ((|TP2'−CP2'|−|TP1−CP1'|)/2). Next, in step S608, the processor 110 determines whether the new second position deviation parameter (DP2') is greater than, less than or equal to 0.

In this embodiment, if the processor 110 determines that the second position deviation parameter (DP2') is less than 0, it means that the second motor 130 is likely in the first motor state of FIG. 7A. In step S609, the processor 110 obtains a ninth parameter equal to the new second target position parameter plus the eighth parameter, and updates the second target position parameter to the ninth parameter (TP2"=TP2'+(|TP2'−CP2'|−|TP1−CP1'|)/2). In other words, with the second target position parameter (TP2') of the second rotating shaft 131 updated to the updated second target position parameter (TP2") by the processor 110 for the second motor 130, the degree of force of the second motor 130 is automatically decreased since the adjusted second current position parameter (CP2') is closer to the updated second target position parameter (TP2"). Further, incidentally, because the first motor 120 and the second motor 130 are interlocked to commonly apply a rotating force on the robotic arm 143, the degree of force of the first motor 120 is correspondingly changed if the degree of force of the second motor 130 is changed.

On the other hand, if the processor 110 determines that the new second position deviation parameter (DP2') is greater than 0, it means that the second motor 130 is likely in the second motor state of FIG. 7B. In step S610, the processor 110 obtains a tenth parameter equal to the new second target position parameter minus the eighth parameter, and updates the second target position parameter to the tenth parameter (TP2"=TP2'−(|TP2'−CP2'|−|TP1−CP1'|)/2). In other words, with the second target position parameter (TP2') of the second rotating shaft 131 updated to the updated second target position parameter (TP2") by the processor 110 for the second motor 130, the degree of force of the second motor 130 is automatically decreased since the adjusted second current position parameter (CP2') is closer to the updated second target position parameter (TP2"). Further, similarly, because the first motor 120 and the second motor 130 are interlocked to commonly apply a rotating force on the robotic arm 143, the degree of force of the first motor 120 is correspondingly changed if the degree of force of the second motor 130 is changed.

However, when the processor 110 determines that the adjusted second position deviation parameter (DP2') is equal to 0, the processor 110 would repeat the step S607 to re-read the first motor 120 and the second motor 130. In other words, since the degrees of force of the first motor 120 and the second motor 130 are changed over time, (non-constant force output), positions of the first rotating shaft 121 of the first motor 120 and the second rotating shaft 131 of the second motor 130 would show an oscillating effect over time (non-constant positions). In this regard, by continuously repeating step S607, the processor 110 can determine whether the first motor 120 is in the motor state of FIG. 7A or FIG. 7B so as to perform a finer parameter adjustment on the updated second target position parameter (TP2') again.

In this way, the automatic control method of the present embodiment can sequentially decrease the degree of force of the second motor 130 by a two-stage determination procedure, so that the first motor 120 and the second motor 130 can have the even force output to effectively solve the problem of the uneven force output for the first motor 120 and the second motor 130. In addition, the automatic control device of the invention is not limited to perform only one of the automatic control methods of FIG. 4A, FIG. 4B, FIG. 6A and FIG. 6B. In an embodiment, the automatic control device of the invention may also synchronously execute the automatic control methods of FIG. 4A, FIG. 4B, FIG. 6A and FIG. 6B to perform the adjustment procedure on both the motor with smaller degree of force and the motor with larger degree of force, so as to solve the problem of the uneven force output for the first motor 120 and the second motor 130 more quickly and effectively.

Figure 8:
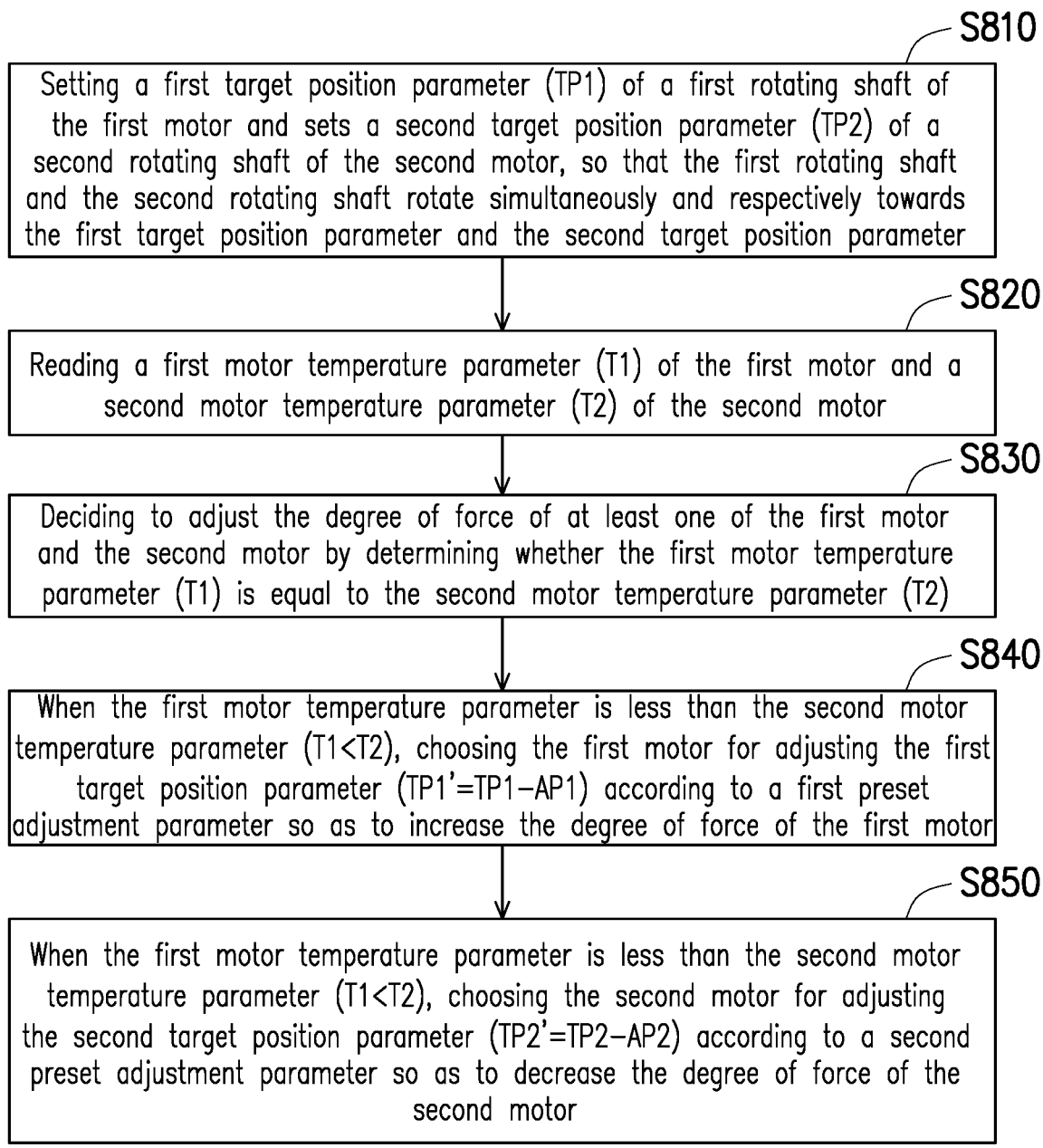
FIG. 8 is a flowchart of an automatic control method according to another embodiment of the invention.

FIG. 8 is a flowchart of an automatic control method according to another embodiment of the invention. With reference to FIG. 1, FIG. 2 and FIG. 8, the automatic control method of FIG. 8 is at least adapted to the automatic control device 100 of FIG. 1 and FIG. 2. The processor 110 of the automatic control device 100 can execute steps S810 to S850 to perform a force adjustment on the first motor 120 and the second motor 130. In step S810, the processor 110 can set a first target position parameter (TP1) of the first rotating shaft 121 of the first motor 120 and set a second target position parameter (TP2) of the second rotating shaft 131 of the second motor 130, so that the first rotating shaft 121 and the second rotating shaft 131 rotate simultaneously and respectively towards the first target position parameter (TP1) and the second target position parameter (TP2). However, it should be noted that, although the processor 110 does drive the first motor 120 and the second motor 130 according to the first target position parameter (TP1) and the second target position parameter (TP2), as an actual rotating result, the first rotating shaft 121 and the second rotating shaft 131 may not be able to rotate to the first target position parameter (TP1) and the second target position parameter (TP2) for sure due to influence of gravity on the robotic arm 143 or a mechanical structure design of the automatic joint mechanism 100B. When that happens, the first motor 120 and the second motor 130 may encounter the uneven force output, which further leads to at least one motor among the first motor 120 and the second motor 130 being overheated.

Therefore, in step S820, after the first rotating shaft 121 and the second rotating shaft 131 rotate to a first current position and a second current position according to the first target position parameter (TP1) and the second target position parameter (TP2), the processor 110 can read a first motor temperature parameter (T1) of the first motor 120 and a second motor temperature parameter (T2) of the second motor 130. In step S830, the processor 110 can decide to adjust the degree of force of at least one of the first motor 120 and the second motor 130 by determining whether the first motor temperature parameter (T1) is equal to the second motor temperature parameter (T2). In step S840, when the first motor temperature parameter is less than the second motor temperature parameter (T1<T2), the first motor 120 with lower temperature is chosen for adjusting the first target position parameter (TP1'=TP1−AP1) according to a first preset adjustment parameter (AP1) so as to increase the degree of force of the first motor. In step S850, when the second motor temperature parameter is less than the second motor temperature parameter (T1<T2), the second motor 130 with higher temperature is chosen for adjusting the first target position parameter (TP2'=TP2−AP2) according to a second preset adjustment parameter (AP2) so as to increase the degree of force of the first motor.

Further, incidentally, in this embodiment, the first preset adjustment parameter (AP1) and the second preset adjustment parameter (AP2) may be decided by, for example, sizes of the parameter values of 1% to 10% of the first target position parameter (TP1') and the second target position parameter (TP2'). Also, in this embodiment, after the processor 110 executes steps S810 to S850 to perform the force adjustment on at least one of the first motor 120 and the second motor 130, the processor 110 would wait for a preset period of time (e.g., 5 minutes) before executing the next force adjustment. In other words, the processor 110 would execute the next force adjustment after the degrees of force of the first motor 120 and the second motor 130 are correspondingly adjusted or after the temperatures of the first motor 120 and the second motor 130 are correspondingly changed. In this way, the degrees of force of the first motor 120 and the second motor 130 may be effectively adjusted without getting an invalid adjustment result caused by setting the parameters too frequently.

Accordingly, the automatic control method of the present embodiment can effectively prevent the first motor 120 and the second motor 130 from being overheated. The automatic control method of the present embodiment can adjust the target position of the motor with higher temperature to be closer to the current position for decreasing the degree of force of the motor with higher temperature, and can adjust the target position of the motor with lower temperature to be farther from the current position for increasing the degree of force of the motor with lower temperature. Nonetheless, in an embodiment, the automatic control device 100 may also effectively prevent the first motor 120 and the second motor 130 from being overheated simply by adjusting only the motor with higher temperature or only the motor with lower temperature. In addition, more specifically, other than using the method of adjusting the degree of force the motor by calculating the current position and the target position of the rotating shaft of the motor as described in the embodiments of FIG. 4A, FIG. 4B, FIG. 6A and FIG. 6B, the automatic control device of the invention may also adjust the degree of the motor by using the method of determining the temperature of the motor described in the embodiment of FIG. 8.

In summary, the automatic control method and the automatic control device of the invention can have the first motor and the second motor commonly disposed in one automatic joint mechanism to simultaneously operate and move the same robotic arm, and can decide to adjust the degree of force of at least one of the first motor and the second motor by analyzing the position deviation parameter and the motor temperature parameter of at least one of the first motor and the second motor. Moreover, the automatic control method and the automatic control device of the invention can adjust the target position of at least one of the first rotating shaft of the first motor and the second rotating shaft of the second motor so that the degree of force of at least one of the first motor and the second motor may be automatically and correspondingly adjusted. As a result, the automatic control method and the automatic control device of the invention can achieve the even force output for the interlocked motors to thereby effectively reduce the occurrence of power loss due to the motor being overheated.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An automatic control method, adapted to an automatic joint mechanism, wherein the automatic joint mechanism comprises a first motor and a second motor, and the automatic control method is adapted to perform a force adjustment on the first motor and the second motor, wherein the automatic control method comprises:
    setting a first target position parameter of a first rotating shaft of the first motor and setting a second target position parameter of a second rotating shaft of the second motor, so that the first rotating shaft and the second rotating shaft rotate simultaneously and respectively towards the first target position parameter and the second target position parameter;
    reading a first motor state parameter of the first motor and reading a second motor state parameter of the second motor;
    deciding whether to adjust a degree of force of at least one of the first motor and the second motor based on the first motor state parameter and the second motor state parameter; and
    when the first motor state parameter is different from the second motor state parameter, choosing at least one of the first motor and the second motor for adjusting at least one of the first target position parameter and the second target position parameter, so that the degree of force of at least one of the first motor and the second motor is automatically and correspondingly adjusted,
    wherein the first motor state parameter is a first motor temperature parameter of the first motor, and the second motor state parameter is a second motor temperature parameter of the second motor,
    wherein the step of deciding whether to adjust the degree of force of at least one of the first motor and the second motor based on the first motor state parameter and the second motor state parameter comprises:
    deciding to adjust the degree of force of at least one of the first motor and the second motor by determining whether the first motor temperature parameter is equal to the second motor temperature parameter,
    wherein when the first motor temperature parameter is less than the second motor temperature parameter, the step of choosing at least one of the first motor and the second motor for adjusting at least one of the first target position parameter and the second target position parameter comprises:
    choosing the first motor for adjusting the first target position parameter according to a first preset adjustment parameter so as to increase the degree of force of the first motor; and
    choosing the second motor for adjusting the second target position parameter according to a second preset adjustment parameter so as to decrease the degree of force of the second motor.

2. The automatic control method according to claim 1, wherein the first motor and the second motor are interlocked, and configured to commonly apply a force on a robotic arm of the automatic joint mechanism,
    wherein if the degree of force of one of the first motor and the second motor is changed, another one of the first motor and the second motor is correspondingly changed.

3. An automatic control device, comprising:
    an automatic joint mechanism, comprising a first motor and a second motor; and
    a processor, coupled to the first motor and the second motor, wherein the processor is adapted to perform a force adjustment on the first motor and the second motor,
    wherein the processor sets a first target position parameter of a first rotating shaft of the first motor and sets a second target position parameter of a second rotating shaft of the second motor, so that the first rotating shaft and the second rotating shaft rotate simultaneously and respectively towards the first target position parameter and the second target position parameter,
    wherein the processor reads a first motor state parameter of the first motor and reads a second motor state parameter of the second motor,
    wherein the processor decides whether to adjust a degree of force of at least one of the first motor and the second motor based on the first motor state parameter and the second motor state parameter, wherein when the first motor state parameter is different from the second motor state parameter, the processor chooses at least one of the first motor and the second motor for adjusting at least one of the first target position parameter and the second target position parameter, so that the degree of force of at least one of the first motor and the second motor is automatically and correspondingly adjusted, wherein the first motor state parameter is a first motor temperature parameter of the first motor, and the second motor state parameter is a second motor temperature parameter of the second motor, wherein the processor decides to adjust the degree of force of at least one of the first motor and the second motor by determining whether the first motor temperature parameter is equal to the second motor temperature parameter, wherein the first motor state parameter is less than the second motor state parameter, wherein the processor adjusts the first target position parameter of the first motor according to a first preset adjustment parameter so as to increase the degree of force of the first motor, wherein the processor adjusts the second target position parameter of the second motor according to a second preset adjustment parameter so as to decrease the degree of force of the second motor.

4. The automatic control device according to claim 3, wherein the first motor and the second motor are interlocked, and configured to commonly apply a force on a robotic arm of the automatic joint mechanism, wherein if the degree of force of one of the first motor and the second motor is changed, another one of the first motor and the second motor is correspondingly changed.

* * * * *